US007923402B1

(12) United States Patent
Cao et al.

(10) Patent No.: US 7,923,402 B1
(45) Date of Patent: Apr. 12, 2011

(54) METAL ALLOY FOR ELECTROCHEMICAL OXIDATION REACTIONS AND METHOD OF PRODUCTION THEREOF

(75) Inventors: Lixin Cao, Highland Park, NJ (US); Yu-Min Tsou, Princeton, NJ (US); Emory De Castro, Nahant, MA (US)

(73) Assignee: BASF Fuel Cell GmbH, Frankfurt am Main (DE)

( * ) Notice: Subject to any disclaimer, the term of this patent is extended or adjusted under 35 U.S.C. 154(b) by 382 days.

(21) Appl. No.: 11/523,483

(22) Filed: Sep. 19, 2006

Related U.S. Application Data

(63) Continuation-in-part of application No. 10/305,295, filed on Nov. 26, 2002, now abandoned.

(51) Int. Cl.
| | |
|---|---|
| *B01J 21/18* | (2006.01) |
| *B01J 23/00* | (2006.01) |
| *B01J 23/40* | (2006.01) |
| *B01J 23/74* | (2006.01) |
| *C22C 5/04* | (2006.01) |
| *H01M 4/02* | (2006.01) |
| *H01M 4/36* | (2006.01) |
| *H01M 4/90* | (2006.01) |
| *H01M 4/92* | (2006.01) |

(52) U.S. Cl. ........ 502/185; 502/180; 502/182; 420/462; 420/466; 429/524; 429/526

(58) Field of Classification Search .............. 502/101, 502/185, 326, 182; 420/462, 466; 429/40–44, 429/524, 526
See application file for complete search history.

(56) References Cited

U.S. PATENT DOCUMENTS

| 3,536,632 | A  | * | 10/1970 | Kroll .............................. 502/107 |
| 4,431,574 | A  | * | 2/1984  | Bournonville et al. ....... 502/261 |
| 6,303,809 | B1 | * | 10/2001 | Chi et al. ...................... 556/136 |
| 6,551,960 | B1 | * | 4/2003  | Laine et al. .................... 502/327 |
| 2008/0280753 | A1 | * | 11/2008 | Watanabe et al. ............. 502/101 |

OTHER PUBLICATIONS

"Oxidation of Methanol on 2nd and 3rd Row Group VIII Transition Metals (Pt, Ir, Os, Pd, Rh, and Ru): Application to Direct Methanol Fuel Cells," Jeremy Kua et al. J. Am. Chem. Soc. 1999, 121, pp. 10928-10941.*

"Novel Pt-Ru nanoparticles formed by vapour deposition as efficient electrocatalyst for methanol oxidation Part 1: Preparation and physical characterization," Pasupathi Sivakumar et al. Electrochimica Acta 50 (2005), pp. 3312-3319.*

* cited by examiner

*Primary Examiner* — Patricia L Hailey
(74) *Attorney, Agent, or Firm* — Charles A. Muserlian

(57) ABSTRACT

A method of producing a finely divided ruthenium-platinum alloy catalyst comprising:
(i) forming a mixture of platinum β-diketone and ruthenium β-diketone on a carbon support,
(ii) both, platinum β-diketone and ruthenium β-diketone having a decomposition temperature within 20° C. of each other,
(iii) decomposing said platinum β-diketone and ruthenium β-diketone on a carbon support at a temperature of at least 260° C. in the absence of a reducing agent
(iv) followed by a reduction effected with a hydrogen containing gas mixture and a method from oxidizing methanol.

7 Claims, 1 Drawing Sheet

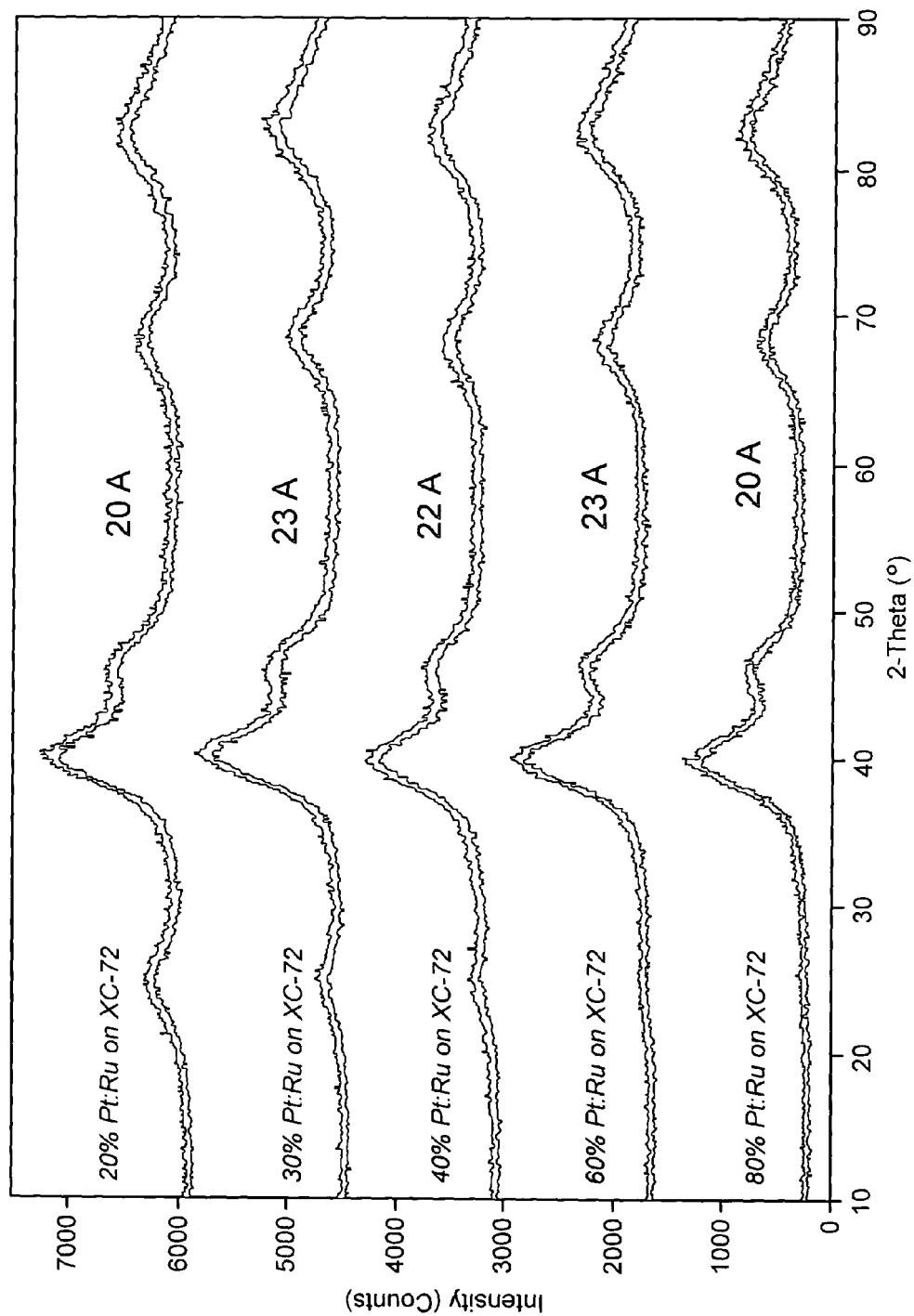

METAL ALLOY FOR ELECTROCHEMICAL OXIDATION REACTIONS AND METHOD OF PRODUCTION THEREOF

PRIOR APPLICATION

This application is a continuation-in-part of U.S. patent application Ser. No. 10/305,295 filed Nov. 26, 2002 now abandoned.

An alloyed catalyst for electrooxidation reactions, and in particular to a binary platinum-ruthenium alloy suitable as the active component of a direct methanol fuel cell anode and a method of producing the same.

BACKGROUND OF THE INVENTION

Direct methanol fuel cells (DMFC) are widely known membrane electrochemical generators in which oxidation of an aqueous methanol solution occurs at the anode. As an alternative, other types of light alcohols such as ethanol, or other species that can be readily oxidized such as ethylene glycol, dimethyl ethylene glycol and oxalic acid, can also be used as the anode feed of a direct type fuel cell, and the catalyst of the invention can be also useful in these less common cases.

In comparison to other types of low temperature fuel cells, which generally oxidize hydrogen, pure or in admixture, at the anode compartment, DMFC are very attractive as they make use of a liquid fuel, which gives great advantages in terms of energy density and is much easier and quicker to load or refill. On the other hand, the electrooxidation of alcohol fuels is characterized by slow kinetics, and requires finely tailored catalysts to be carried out at current densities and potentials of practical interest. DMFC have a strong thermal limitation as they make use of an ion-exchange membrane as the electrolyte, and such component cannot withstand temperatures much higher than 100° C. which affects the kinetics of oxidation of methanol or other alcohol fuels in a negative way and to a great extent.

The quest for improving the anode catalysts has been ceaseless at least during the last twenty years. It is well known to those skilled in the art that the best catalytic materials for the oxidation of light alcohols are based on binary or ternary combinations of platinum and other noble metals. In particular, platinum-ruthenium binary alloys are largely preferred in terms of catalytic activity, and they have been used both as catalyst blacks and as supported catalyst, for example on active carbon, and in most of the cases incorporated into gas diffusion electrode structures suited to be coupled to ion-exchange membranes.

Platinum and ruthenium are, however, very difficult to combine into true alloys: the typical Pt:Ru 1:1 combination disclosed in the prior art almost invariably results in a partially alloyed mixture. The method for the production of binary combinations of platinum and ruthenium of the prior art starts typically from the co-deposition of colloidal particles of suitable compounds of the two metals on a carbon support, followed by chemical reduction. Co-deposition of platinum and ruthenium chlorides or sulfites followed by chemical reduction in aqueous or gaseous environment lies probably in the very different reactivity of the two metal precursors towards the reducing agents. The platinum complex is, in most cases, reduced much more quickly, and a phase separation of the two metal occurs before the conversion is completed. A platinum-rich alloy and a separate ruthenium phase are thus commonly observed.

Some methods did not include a step of deposition of precursor compounds onto the support. For example, U.S. Pat. No. 6,551,960 by Laine, et al. taught a method for depositing PtRu methanol reformation catalyst on activated carbon, metal, and metal oxide supports. In the described procedure, the solvent polyhydroxylic alcohols, such as ethylene glycol, glycerol, triethanolamine, or trihydroxymethylaminomethane was used as the reducing agent to react with dissolved Pt and Ru compounds, including chlorides, acetates, and acetylacetonate. Two severe factors can adversely influence the uniformity of the precursor compounds on the supports: (1) the process where two soluble species react to form a precipitate usually results in uncontrolled deposition process and the initially formed precipitates will act as nuclei centers for more precipitates to occur, so large particles and dendrite growth will occur; (2) Pt(acac)$_2$ is much easier than Ru(acac)$_2$ to reduce, so the formation of Pt and Ru metal particles will not be simultaneous and the resulting metal particles will be very poorly alloyed.

Outside catalyst or fuel cell area, there were some patent teachings about chemical vapor deposition to make metal or metal alloy film. For example, U.S. Pat. No. 6,303,809 taught about making Ru film and Pt/Ru film by chemical vapor depositions of selected compounds, such as those containing carbon monoxide and β-diketones, e.g., RC(O)CHC(O)R$^1$ where R and R$^1$ are alkyl groups. It was described that highly reflective, smooth, adhesive films are formed on the surface of Si wafer, Pyrex glass, and Al2O3. These films are not used as catalysts. Because of the process nature of this approach, only films containing very large particles, well above microns, can be formed.

OBJECTS OF THE INVENTION

It is an object of the invention to provide a method for obtaining highly alloyed catalysts optionally supported on an inert support.

It is another object of the invention to provide a method for obtaining highly alloyed platinum-ruthenium catalysts exhibiting a high catalytic activity towards the oxidation of methanol and other organic fuels.

It is another object of the invention to provide a process for the preparation of catalysts with high activity for the electrooxidation of organic species.

It is yet another object of the present invention to provide an electrochemical process for highly efficient oxidation of light organic molecules.

These and other objects and advantages of the invention will become obvious from the following detailed descriptions.

SUMMARY OF THE INVENTION

Under one aspect, the invention consists of a method for the production of alloyed catalysts starting from complexes of the two metals with organic ligands, comprising a decomposition thermal treatment optionally followed upon completion by a reduction treatment. Under another aspect, the invention consists of a method for the production of alloyed platinum-ruthenium catalysts starting from complexes of the two metals with organic ligands, comprising a decomposition thermal treatment followed upon completion by a reduction treatment.

Under another aspect, the invention consists of a platinum-ruthenium catalyst in finely divided form on a carbon support obtained by simultaneous thermal decomposition of ruthenium acetylacetonate and platinum acetylacetonate on a carbon support at high temperatures.

Under yet another aspect, the invention consists of an electrochemical process of oxidation of methanol or other fuels at the anode compartment of a fuel cell equipped with a platinum-ruthenium alloyed catalyst obtained by simultaneous thermal decomposition of organic complexes of the two metals and a fuel cell with said catalyst.

The purpose of the present invention is to make PtRu alloy catalyst particles in the range of tens to hundreds of angstroms. The small particle size provides very large surface area for catalytic reactions. It is well known in the catalysis field in general, and fuel cell in particular, that real surface area of a catalyst is very critical for the total activity. In the case of methanol oxidation, methanol molecules will only react with the atoms on the surface of the PtRu catalyst particles. The reaction involves electron transfer between methanol and the catalyst surface as well as formation of CO2 and hydrogen ions. Atoms inside a particle are not accessible for methanol molecules. As the size of a catalyst particle decreases, higher percentage of atoms will be positioned on the surface. For example, a particle of 3 nm will have much higher percentage of atoms on the surface than a particle with 300 nm (0.3 microns). According to theoretical calculation (W. Romanowski, Surf. Sci., 18, 373 (1969), assuming a Pt particle exhibits cubo-octahedral structure, then the percentage of atoms on the surface of a 3 nm particle is about≈35-40%; The percentage of atoms for a 15 nm is less than 10% and that for 300 nm Pt particle is so small, it's negligible in comparison. Real surface area is usually used to describe how many total areas of surface atoms have in certain amount of catalyst: square meter per 1 gram of catalyst. The elucidation of the importance of catalyst surface area can be found in the article: "DMFC: From Fundamental Aspects to Technology Development" Fuel Cells 2001, 1, No. 2, page 1.

DETAILED DESCRIPTION OF THE PREFERRED EMBODIMENTS

The method for the production of alloyed catalysts of the invention provides a simultaneous reduction of the two metals which is made possible by a careful choice of the precursors. In the following description, reference will be made to the production of highly alloyed platinum-ruthenium binary catalysts for fuel cells, but it will be apparent to one skilled in the art that the method has a more general validity for several kinds of other alloys.

It has been surprisingly found that organic complexes of platinum and ruthenium, in contrast to salt precursors such as chlorides or sulfites, usually have very similar temperatures of decomposition, their difference being e.g. lower than 20° C., and in some cases as low as 10° C. The latter is, for instance, the case of Pt and Ru complexes with 2,4-pentanedioate, a ligand which is also known under the ordinary name of acetylacetonate (henceforth abbreviated as "acac", as common in the art).

Many organic β-diketonato compounds of the formula

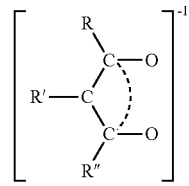

where R, R', R" are alkyl groups can be used but acetylacetonate is a particularly preferred ligand also because it is commercially available and straightforward to handle.

The preferred procedure for practicing the invention must take advantage of the close decomposition temperatures of the two precursors, leading to a simultaneous conversion of the complexes and at the same time minimizing the formation of oxides. To achieve this, the thermal treatment leading to decomposition should start with a heating step to be carried out with a fast ramping rate, so that the platinum complex has virtually no time to start reacting before the decomposition of ruthenium starts taking place as well, and the whole thermal treatment should be carried out in the absence of air or other oxidizing species.

Both acetylacetonate complexes of platinum and ruthenium will be decomposed to the corresponding metal atom and oxidized (decomposed) ligand which would evaporate at the decomposition temperature of the complexes. Therefore, no reduction step is needed. However, a reduction step might be added in case that some unexpected or unknown impurities exist and cause formation of a small percentage of oxides or similar species along with the metal atom. However, the reduction agent, such as hydrogen, should be introduced after the thermal decomposition has been completed; otherwise, the hydrogen will preferentially reduce Pt acetylacetonate to Pt atom and reduce Ru acetylacetonate at a much slower rate. The result is a poorly alloyed metal mixture. The preferred platinum precursor, which is $Pt(acac)_2$, starts decomposing around 250° C., while the preferred ruthenium precursor, $Ru(acac)_3$, starts decomposing at 260° C. It is preferable, therefore, that no reducing agent (if used) comes in contact with the catalyst material before a temperature of 260° C. is attained and the most preferred reduction temperature is around 300° C., for instance between 280 and 320° C.

To take all these different factors into account, in a preferred embodiment, the platinum and ruthenium complexes, usually absorbed on an inert support such as conductive carbon, are rapidly heated in an inert atmosphere, for example an argon atmosphere, until reaching a final temperature of 300±20° C. Once the final temperature is reached, the catalyst material can be (1) kept under inert atmosphere for a period of time; or (2) after equilibrated at the final temperature, the gas was switched to a hydrogen-containing gas mixture for 2-4 hours, then switched back to inert atmosphere for a period of time. For both cases, afterwards, the catalyst is cooled down in inert atmosphere to room temperature. The catalyst so obtained can be incorporated in a gas diffusion anode to be used in a DMFC or other kind of direct fuel cell, showing a higher activity due to the much higher extent of alloy formation.

The preferred embodiment of the invention which is obtained by heating platinum acetylacetonate and ruthenium acetylacetonate on a carbon support at temperatures above 260° C. results in a finely divided catalyst of 20 to 500 angstroms, preferably about 30 angstroms. The finely divided dispersed of platinum (acac) and ruthenium (acac) on the carbon support before the decomposition results in the finely dispersed catalyst with excellent activity.

BRIEF DESCRIPTION OF DRAWING

FIG. 1 is an X-ray diffraction graph of the catalysts of Example 5.

In the following examples, there are described some preferred embodiments to illustrate the invention. However, it is to be understood that the invention is not intended to be limited to the specific embodiments.

EXAMPLE 1

35 g of Vulcan XC-72 conductive carbon were suspended in a 2 liter beaker containing 1 liter of acetone. The mixture was subjected to vigorous dispersion with a Silverson[R] disperser for 10 minutes. In a separate 5 liter flat-bottom flask, 21.9 grams of Pt(acac)$_2$ and 22.2 grams of Ru(acac)$_3$ were suspended in 1.5 liters of acetone. The carbon dispersion was then transferred to the noble metal dispersion, and the resulting mixture was stirred for 30 minutes while the flask was maintained at 25° C. by means of a water bath. The slurry so obtained was sonicated for 30 minutes and stirred magnetically overnight. Acetone was then evaporated by placing the flask in a water bath at 60° C. After 6 hours, most of the solvent was removed. A stream of nitrogen was passed through the mixture to bring the evaporation to completion. 79.0 grams of carbon impregnated with catalytic material were obtained at this stage.

This sample was heated in an argon stream at a rate of 30° C./minute until reaching 300° C. After thermal stabilization, the pure argon flow was replaced with a 15% hydrogen flow in argon at a flow-rate of 200 ml/minute. After 3 hours, the reducing atmosphere was again replaced with a pure argon stream at a flow-rate of 100 ml/minute. After 3 hours, the reducing atmosphere was again replaced with a pure argon stream at a flow-rate of 100 ml/minute. The sample was finally allowed to cool to room temperature.

EXAMPLE 2

A Vulcan XC-72 carbon sample impregnated with Pt(acac)$_2$ and Ru(acac)$_3$ was obtained as in Example 1. The resulting sample was heated in an argon stream at a rate of 30° C./minute until reaching 300° C., then, still under argon, the temperature was held at 300° C. for 3 hours. Finally, the temperature was allowed to cool to room temperature under argon. During the entire process, no hydrogen was used.

EXAMPLE 3

A Vulcan XC-72 carbon sample impregnated with Pt(acac)$_2$ and Ru(acac)$_3$ was obtained as in the previous examples. The resulting sample was subjected to a 100 ml/minute of 15% hydrogen in argon stream at room temperature, then heated to 300° C. at a rate of 30° C./minute. After holding at 300° C. for 3 hours, the gas stream was switched to pure argon and the sample was allowed to cool to room temperature.

EXAMPLE 4

A Vulcan XC-72 carbon sample impregnated with Pt(acac)$_2$ and Ru(acac)$_3$ was obtained as in Example 2

The sample was heat treated as in Example 1, except that the heating ramp was 5° C./minute instead of 30° C./minute.

EXAMPLE 5

The four catalysts obtained in the previous examples were subjected to X-ray diffraction. Alloy formation was evaluated through the shift of the 220 peak. The particle size of the catalyst of Example 3 resulted much bigger than those of the remaining three catalysts. Moreover, as the analysis of the alloy phase in the following Table shows, almost complete alloys were formed in Examples 1 and 2 (Ru=52-53% vs. a theoretical value of 50%), while in the conditions of Example 4, the alloying was less complete (Ru=44%). In the conditions of Example 3, when hydrogen was fed since the start of the thermal cycle, the extent of the alloying was clearly insufficient (Ru=19.9%).

TABLE alloy extent analysis evaluated through the (220) peak

| Example # | d (220) | T (220) | a-d (220) | a-T (220) | Average | Ru(mol %) |
|---|---|---|---|---|---|---|
| 1 | 1.3696 | 68.447 | 3.8738 | 3.8769 | 3.8753 | 52.5 |
| 2 | 1.3695 | 68.450 | 3.8735 | 3.8767 | 3.8751 | 52.8 |
| 3 | 1.3801 | 67.853 | 3.9035 | 3.9067 | 3.9051 | 19.9 |
| 4 | 1.3722 | 68.300 | 3.8812 | 3.8842 | 3.8827 | 44.5 |

Therefore, the results indicate that only argon should be used in the decomposition of the two acetylacetonate complexes. If hydrogen is used before decomposition occurs, platinum will be preferentially reduced and result in a lower alloy extent, since Ru(acac)$_3$ is reduced more slowly than Pt(acac)$_2$. Conversely, the hydrogen treatment after complete decomposition appeared to have a negligible effect in this regard. At the same time, the heating rate should be relatively fast to ensure a virtually simultaneously decomposition instead of sequential decomposition of Pt(acac)$_2$ (starting around 250° C.), followed by Ru(acac)$_3$ (starting around 260° C.).

The test of the catalysts was conducted by rotating disk electrode (RDE). A dilute ink of carbon-supported catalyst was prepared by mixing 33 mg of supported catalyst with 50 ml of acetone. A total of 10 microliters of this ink was applied in two to four coats onto the tip of a glassy carbon rotating electrode of 6 mm diameter.

The electrode was placed in a solution of 0.5 M $H_2SO_4$ containing 1 M of methanol at 50° C. A platinum counter electrode and a $Hg/Hg_2SO_4$ reference electrode were connected to a Gamry Potentiostat along with rotator (Pine Instrument) and the rotating disk electrode (Perkin Elmer). Under 2500 RPM, a potential scan was applied (10 mV/s) whereby a plateau representing dissolved methanol oxidation was recorded. The rising portion of the curve was used as the measure for activity towards methanol oxidation. The more negative this rising portion occurs, the more active is the catalyst. The actual comparison is carried out by recording the intersection point between the baseline of the rotating disk voltammogramme (current=0) and the rising portion of the curve for different catalyst. This value is defined as the ignition potential, which is lower as more active is the catalyst. In the above disclosed conditions, the catalysts of the Examples 1 and 2 both showed an ignition potential of −0.33 V vs. $Hg/Hg_2SO_4$, while a carbon supported Pt.Ru 1:1 catalyst according to the prior art (commercialized by the De Nora North America, Inc. E-TEK division) showed an ignition potential of −0.18V, and a state-of-the art carbon supported Pt catalyst, also commercialized by De Nora North America, USA, showed an ignition potential of −0.09V.

A series of PtRu catalysts on VC-72 Vulcan carbon with a weight percentage of 20 to 80% of the total precious metal per 100 g of the total catalyst were prepared by the procedure of Example 2, with thermal decomposition up to 300° C. and held there for a period of time and then cooled. The crystal size of each catalyst is labelled in FIG. 1 where A is in angstrom. FIG. 1 is an X-ray diffraction graph of the catalysts.

In the description and claims of the present application, the word "comprise" and its variation such as "comprising" and "comprises" are not intended to exclude the presence of other elements or additional components.

Various modifications of the process and catalysts of the invention may be made without departing from the spirit or scope thereof and it is to be understood that the invention is intended to be limited only as defined in the appended claims.

What we claim is:

1. A method of producing a finely divided ruthenium-platinum alloy catalyst comprising:
   (i) forming a mixture of platinum β-diketone and ruthenium β-diketone on a carbon support,
   (ii) both, platinum β-diketone and ruthenium β-diketone having a decomposition temperature within 20° C. of each other,
   (iii) decomposing said platinum β-diketone ruthenium β-diketone on a carbon support at a temperature of at least 260° C. in the absence of a reducing agent
   (iv) followed by a reduction effected with a hydrogen containing gas mixture.

2. The method of claim 1, wherein the diketone is acetylacetonate.

3. The method of claim 1 wherein the decomposition is effected at 260° C. to 300° C.

4. The method of claim 1 wherein the decomposition is effected in an inert atmosphere at 280 to 320° C.

5. The method of claim 4 wherein the inert atmosphere is argon.

6. The method of claim 1 wherein the decomposition temperature is maintained generally constant for 2 to 4 hours.

7. A method of producing a ruthenium-platinum alloy catalyst comprising forming a mixture of platinum β-diketone and ruthenium β-diketone on a carbon support, both platinum β-diketone and ruthenium β-diketone having a decomposition temperature within 20° C. of each other, decomposing said platinum β-diketone and ruthenium β-diketone on a carbon support at a temperature of at least 260° C. and after equilibrium is reached at the final temperature, the mixture is reduced with a hydrogen containing gas mixture which is only added at a temperature of at least 260° C.

* * * * *